Oct. 28, 1930.  A. McL. NICOLSON  1,779,748
HIGH SPEED TELEVISION SYSTEM
Original Filed Sept. 28, 1927   2 Sheets-Sheet 1
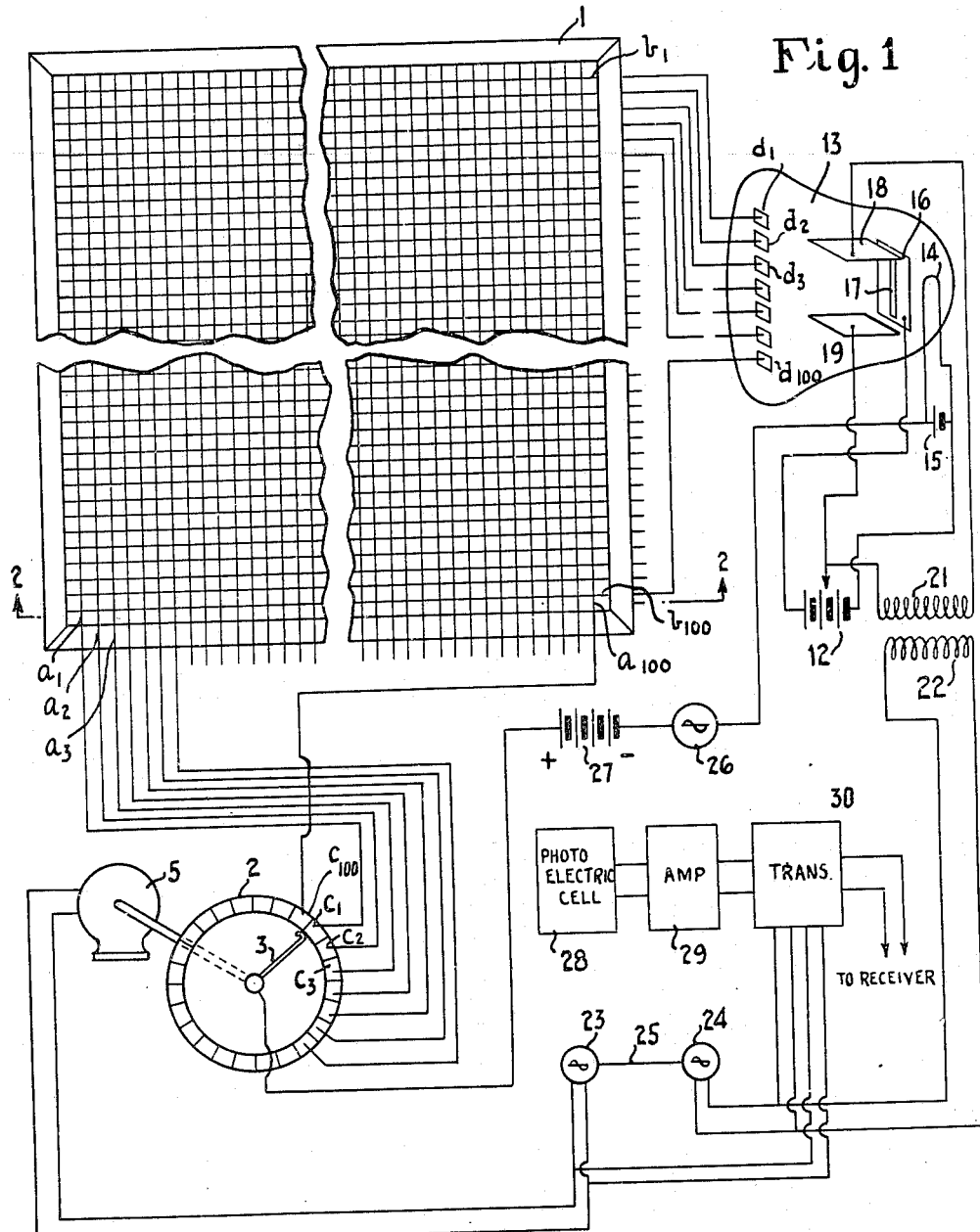
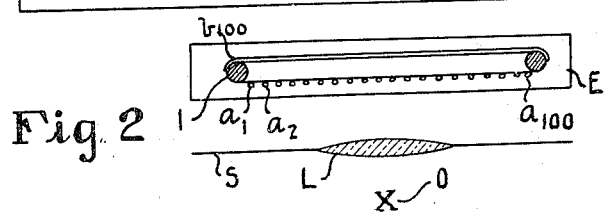
INVENTOR
ALEXANDER McLEAN NICOLSON
BY
Clyde A. Norton
ATTORNEY Oct. 28, 1930.   A. McL. NICOLSON   1,779,748
HIGH SPEED TELEVISION SYSTEM
Original Filed Sept. 28, 1927   2 Sheets-Sheet 2
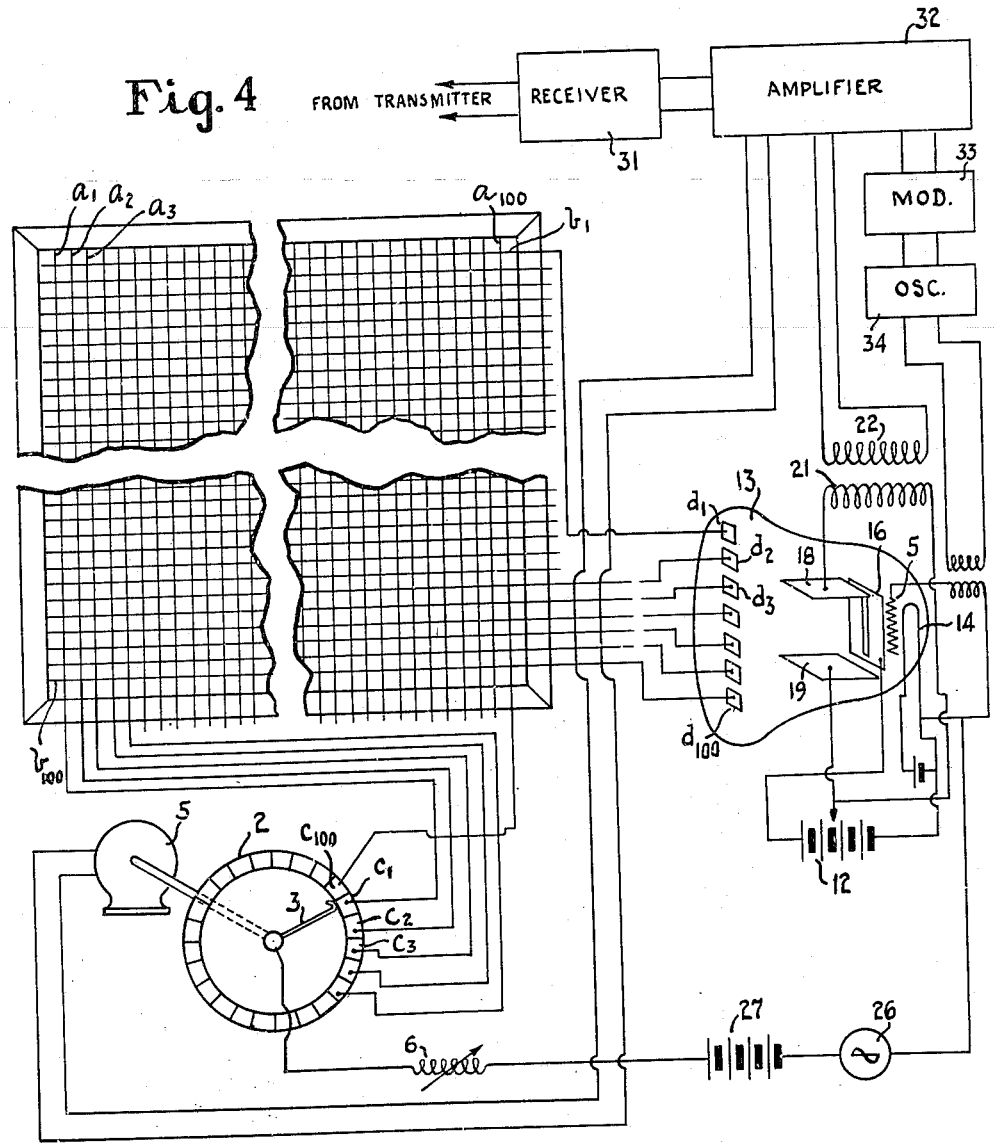
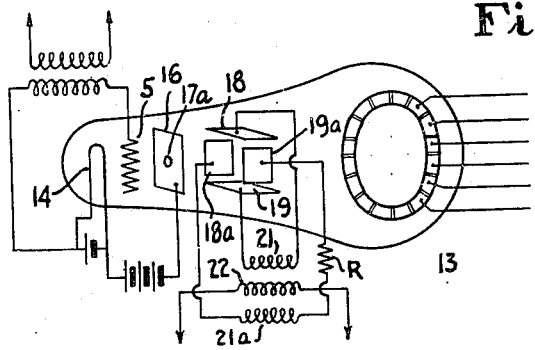
INVENTOR
ALEXANDER McLEAN NICOLSON
BY
ATTORNEY Patented Oct. 28, 1930

1,779,748

UNITED STATES PATENT OFFICE

ALEXANDER McLEAN NICOLSON, OF NEW YORK, N. Y., ASSIGNOR TO COMMUNICATION PATENTS, INC., OF NEW YORK, N. Y., A CORPORATION OF DELAWARE

HIGH-SPEED TELEVISION SYSTEM

Application filed September 28, 1927, Serial No. 222,417. Renewed March 21, 1930.

This invention relates to a method and apparatus for the reproduction and transmission of images by electrical means, and more particularly to a method and apparatus for transmitting images to a distance by wire line or radio, at a speed sufficient to present the illusion of motion, such as is commonly referred to as "television".

It is well known that for the purpose of transmission of images, whether by wire line or radio, it is necessary to determine the light intensity of each unit area of the object whose image is to be transmitted, and to send an indication of some sort which is proportional to the light intensity of such area. At the receiver, it is necessary to control a source of light so that its intensity corresponds, or is proportional, to the light intensity of the particular corresponding unit area of the subject, and also so that its relative position on the receiving screen corresponds to the relative position of the corresponding unit area of the object. It is also well known that in order to achieve "television" of moving objects, it is necessary to transmit approximately sixteen complete images of the object per second.

In most of the systems heretofore proposed, it has been suggested to control the intensity of a spot of light at the receiver in accordance with the intensity of light desired, and to cause the spot to move by reflection across the receiving screen. If it is desired to cover a screen having 100 units of area in each dimension, and therefore containing 10,000 units of area, and if an image of a moving object is to be transmitted, the spot remains on one unit for only 1/160,000 of a second in travelling over the screen, and for only 1/10,000 of a second total time during one second in the case of sixteen complete pictures per second. The necessity of controlling the light intensity of the source of light in the receiver operates, as will be understood, to prevent the use of a very powerful source of light to compensate for the shortness of exposure on any one area. As a result of these conditions, it is very difficult, if not impossible, with known systems, to obtain sufficient illumination of the receiving screen to permit of practical operation of a system. Moreover, the high speed at which it is necessary to scan the object and the receiving screen, has in the past made it difficult to produce a reliably operative device if moving masses are used, because of the difficulty of obtaining the high speeds usually necessary, and because of difficulties of synchronizing the movement of such masses at the transmitter and receiver at such speeds.

It is an object of this invention to provide a method and apparatus capable of operation at the high speeds required to transmit and reproduce images at the rate necessary to present the illusion of motion.

It is a further object of this invention to provide a method and apparatus in which all high speed motions above the limit of those easily obtainable by mechanical motion are obtained by devices devoid of inertia and therefore inherently capable of operation at the very high speeds required.

It is still a further object of this invention to provide a method and apparatus of the class described, utilizing electron discharge devices for determining the position of an illuminating electrical discharge serving to scan the object or receiving screen.

It is still a further object of this invention to provide a method and apparatus of the class described, in which an illuminating electrical discharge is produced between a set of relatively stationary electrodes, and in which the position and pattern traced by the discharge are selected and controlled by an electron discharge device to permit of relative ease in obtaining and controlling the very high speed of travel of such discharge necessary to transmit images in detail at the rate of 16 per second.

It is still a further object of this invention to provide a new and improved form of electron discharge device utilizing an electron beam for selecting between various circuits to be energized at various times.

Still other objects of this invention will be apparent from the specification.

The features of novelty which I believe to be characteristic of my invention are set forth with particularity in the appended claims. My invention itself, however, both as to its fundamental principles and as to its particular embodiments will best be understood by reference to the specification and accompanying drawing, in which like reference characters represent like elements, and in which:

Figure 1 is a diagrammatic view of a transmission system according to my invention.

Figure 2 is a sectional view of the screen electrode system on lines 2—2 of Figure 1.

Figure 3 is a detail view of the preferred form of selector.

Figure 4 is a diagrammatic view of a receiving system similar to Figure 1.

According to my invention, I provide a plurality of sets of electrodes spaced from each other, each set of electrodes being made up of a multiplicity of individual electrodes. The electrodes of each set will preferably, although not necessarily, be in the form of wires stretched parallel in a single plane and closely adjacent to each other. The electrodes of the second set are similarly arranged but in a plane laterally spaced from the first set, and preferably the electrodes of the second set are disposed at an angle with those of the first set.

The electrodes may be likened to coordinates defining the location of any particular point within the area to be scanned, and it will be apparent that if a difference of potential be applied between any arbitrarily chosen electrode of one set and any other arbitrarily chosen electrode of the second set, a discharge will be produced at a point representing the shortest path between these two electrodes, namely at what would be the point of intersection if the electrode systems were all in the same plane: and since there is only one such point for any two electrodes, it will be apparent that by energizing two properly selected electrodes, one in each set, an electrical discharge may be produced at any point of intersection upon the screen. If the electrodes of each set are spaced sufficiently close together, as many points of intersection may be produced as desired, so that it is possible to produce a discharge at any point upon the screen. The electrode systems may be operated in the air, or in a sealed container which may contain air, or any other gas or mixture of gases or finely divided solid matter, at any desired pressure greater or less than or equal to atmospheric pressure, selected for optimum operation, as described in my copending application, Serial Number 218,425, filed Sept. 9, 1927, entitled "Method and apparatus for television and the like." The electrodes themselves may be in the form of wires, ribbons, thin plates or the like, of any suitable material chosen to have the desired operating characteristics, and provided, if desired, with projections, knobs, points or the like, for the purpose of exactly positioning the discharge.

It will be understood that by energizing the electrodes of each set in a predetermined sequence and at a predetermined speed, the discharge between the electrodes may be caused to occur at successive points of intersection in any desired pattern and speed. For instance, if it is desired to scan the screen by a discharge travelling in parallel lines progressively across the screen, one electrode of one section will be connected to one terminal of a suitable source of potential, while the other terminal of such source is progressively connected to all of the electrodes of the other system. As a result of such connection, a discharge will pass across from one electrode to each of the electrodes of the other section in succession. After the discharge takes place to the last electrode, the first terminal of the said source is connected to the next adjacent electrode of the first set and the second terminal of the said source is successively connected to all of the electrodes of the second set, causing a discharge to pass from the second electrode of the first set and all of the electrodes of the second set in succession. By proceeding in a similar manner, a discharge is produced at each and every point of intersection of electrodes on the screen successively, and in order to create the illusion of an image appearing upon the screen, it is necessary that the luminous intensity of the discharge be controlled at each point in accordance with the value of light desired at such points and the speed of travel of the discharge be made sufficiently high.

It is apparent that under such conditions of operation, the electrodes of one set are energized many times as rapidly as those of the other set, in the ratio of the number of wires in one set to one. In the form shown in which one hundred wires are arranged in each set, the ratio of speed is 100 : 1.

In the set in which one electrode is energized while all of the electrodes of the other set are successively energized, which I term the slow speed set, each electrode is energized for 1/1,600 of a second. Speeds of this order are not difficult to obtain by mechanical movement, since a moving brush passing over a commutator having one hundred segments need only revolve at a speed of 960 revolutions per minute to produce this ratio of energization. However, to energize the electrodes of the other system at a speed one hundred times as rapid would clearly be most difficult, if mechanical operation is resorted to. In accordance with my invention, I utilize an inertialess commutator or selector, devoid of moving parts, as will later be described in detail.

A suitable system of lenses, reflectors and the like may be utilized for the purpose of concentrating on the object the light produced by the discharge at the transmitter, while at the receiver, the observer may view the discharge screen directly, or, if desired, the light may be projected upon a second screen for the purpose of enlarging or diminishing the size of the image, or for the purpose of avoiding any harmful effects which might occur, were the screen viewed directly. While I have here referred to "light", it should be understood that the term is not intended to be restricted to visible light, but includes invisible light, both ultra-violet and infra-red, and in fact, under certain conditions, it may be preferable to use only invisible light, preferably infra-red, for scanning at the transmitter.

The inertialess commutator will preferably be in the form of an electron discharge device, without moving parts, since such devices, depending on electron effects, afford speeds of operation far beyond anything required even in television. The commutator or selector according to my invention comprises in its essentials a source of electrons and means for causing the electrons emitted to follow a predetermined path, as a beam. The beam may be controlled either by an electrostatic or an electromagnetic field, or by a combination of both, and may be caused to sweep repeatedly across any predetermined path, such as a straight line, a circle, an ellipse or the like.

A series of targets are provided which are adapted to be played over by the beam of electrons and each target may correspond to an electrode of one system. Appropriate circuits are provided for applying a source of potential to the target upon which the electrons are impinging.

Referring now more particularly to Figure 1, there is provided a frame 1 of insulating material, which frame is preferably in the form of a rectangle, of the size and shape desired. A number of spaced parallel electrodes preferably in the form of wires, such as $a_1, a_2, a_3 \ldots a_{100}$, are provided forming one set of electrodes, which I term the "$a$" electrodes or the slow speed set: a second set of electrodes $b_1, b_2, b_3 \ldots b_{100}$, is provided, which I term the "$b$" electrodes, or high speed set, the electrodes of the second set being preferably arranged at right angles to the electrodes of the first system. The planes of the "$a$" and "$b$" electrode systems are preferably spaced about $1/8''$ apart. The whole assembly may be positioned within a container E having a face of glass, quartz, or other material transparent to the light to be used, and positioned behind an opaque screen S having an opening in which is positioned a suitable lens system L arranged to concentrate the light on the object X at point O: 2 designates a commutator for selecting between electrodes $a_1$, to $a_{100}$, which may comprise a brush 3 adapted to rotate and successively contact with segments $c_1, c_2, c_3 \ldots c_{100}$, each of which is connected to the corresponding electrode $a_1, a_2, a_3 \ldots a_{100}$. The brush 3 may be driven by a suitable synchronous motor 5 operated from source 23. For the sake of simplicity, only a few of the connections are shown, such as $a_1 c_1, a_2 c_2, a_3 c_3,$ and $a_{100} c_{100}$.

An inertialess high speed selector 13 is provided for selecting between the electrodes $b_1, b_2, b_3, \ldots b_{100}$. This selector may comprise an evacuated envelope containing a suitable cathode 14 adapted to emit electrons when energized, as by a source of potential 15: and immediately adjacent thereto, there is provided a shield or anode 16 having a slit 17 therein. The anode 16 is maintained at a positive potential with respect to the cathode by a suitable source 12, such as a battery.

The potential difference between the cathode 14 and the anode 16 is made relatively high for the purpose of attracting electrons toward the anode at a relatively high speed. The anode 16 intercepts the electrons flowing from the cathode 14 with the exception of those which are travelling in a direction such as to pass through the slit 17, and the electrons which pass through the said slit have a sufficiently high velocity to cause them to pass onward in the form of a relatively thin band or beam. In the path of this beam, I provide a plurality of targets, $d_1, d_2, d_3 \ldots d_{100}$, only a few of which are shown, for simplicity, each target corresponding to one of the electrodes of the high speed system $b_1, b_2, b_3 \ldots b_{100}$, and connections such as $b_1 d_1, b_{100} d_{100}$ are provided between the corresponding electrodes and targets. By impressing a control field upon the path of the beam, which field may be either electrostatic or electromagnetic, or a combination of both, the beam may be compressed in the direction of the line of targets until it impinges on one target only at a time: furthermore, by varying the direction of the controlling field or its magnitude, or both, the direction of the beam may be controlled at will in a predetermined manner, so that the beam may be caused to play back and forth across the targets as desired.

In the form shown in Figure 1, for the purpose of simplicity, I have illustrated the targets as being placed in a straight line, and the control means are shown as a pair of electrostatic plates 18 and 19, disposed in the line of the targets adjacent the anode 16. If now, an alternating electrostatic field be impressed between the plates 18 and 19, the beam of electrons will be caused to sweep back and forth over the targets in synchronism with the frequency of fluctuation of the field.

The control electrodes 18 and 19 may be energized by a suitable coil 21, connected in series between them, which coil is in turn coupled to a second coil 22 drawing an alternating current from a suitable source 24. In addition, the relative potential of the plates 18 and 19 may be fixed by a connection to the source of potential 12, which serves to energize the anode 16. It may be desirable to impress a relatively high steady potential upon the plates 18 and 19 to prevent the electrons which pass through the slit 17 from being drawn back to the anode 16.

A frequency controlling connection 25 may be provided between sources 23 and 24: for example, 23 and 24 may be alternators or other suitable sources of alternating current, as vacuum tube oscillators of appropriate power, generating currents having a fixed frequency relation, such that the electron beam is caused to sweep over all of the targets in selector 13 while the brush 3 is in contact with one segment of commutator 2.

For the purpose of energizing the electrodes selected by the two selector systems, a connection may be made from the brush 3 through suitable sources of potential which may comprise a source of uni-directional current 27, such as a battery, and also if desired, a source of alternating current 26, to the cathode 14 of selector 13.

The operation of the system is as follows: As the cathode beam from the cathode 14 plays up and down across the electrodes $d_1$, $d_2$, $d_3$ ... $d_{100}$, the impact of electrons on a particular target causes that target to assume a negative potential. A positive potential, in the meantime, has been impressed upon one of the electrodes $a_1$, $a_2$, $a_3$ ... $a_{100}$, of the slow speed system. If the impedance of the path between the electrodes of the high speed and slow speed systems is small with respect to the internal impedance of the selector 13, the establishment of this difference of potential between two electrodes of the screen system will cause a discharge to pass between them. As the beam sweeps along the series of targets, it will leave the target on which it rested, and as it does so, the circuit through the particular electrode corresponding to that target is interrupted and the discharge passing therefrom terminates. As the beam moves along, it impinges on the adjacent target and the discharge takes place from the electrode corresponding to that target. The operation is such that, for example, if the brush 3 rests on the segment $c_1$, the discharge passes from electrode $a_1$ to electrode $b_1$, $b_2$, $b_3$ ... $b_{100}$, in succession. The brush 3 then travels off segment $c_1$ and comes in contact with segment $c_2$. The discharge then passes from electrode $a_2$ to electrodes $b_{100}$, $b_{99}$, $b_{98}$ ... $b_1$. As the brush 3 continues to rotate, the discharge passes back and forth across the screen, moving progressively in parallel lines across the screen until the entire screen has been covered.

This operation takes place in about one sixteenth of a second, after which the initial cycle of operation is repeated, so that the entire screen is completely covered sixteen times every second. The discharge may be entirely direct current in case the source of alternating current 26 is omitted. An alternating current component may be introduced in the discharge, as will be understood, by the inclusion of said source. An alternating current component may likewise be introduced by omitting the source 26 in the position shown, and by including a grid within the selector 13, interposed between the cathode 14 and the anode 16, and by impressing an alternating electromotive force upon the said grid. The frequency of the alternating current component will preferably be high with respect to the fluctuation of the cathode beam, so that a considerable number of pulsations of current take place while the cathode beam is impinging on any particular target, and under such conditions, the source 26 will preferably be a vacuum tube oscillator of relatively high frequency.

The light produced by the discharge may be caused to play over the object whose image is to be transmitted, and in addition, a suitable light or series of fixed lights, may play upon the object, for the purpose of obtaining the most efficient action from the photo electric cell 28, of any suitable type known in the art, which is exposed to the object. The fixed lights may be of such value as to maintain the photo electric cell at a threshold value such that increase of illumination of any particular point of the object as a result of the discharge on the screen will cause response of the photo electric cell proportional to the intensity of illumination of the particular point in question. The output of the photo electric cell may be amplified to the extent desired by suitable amplifier 29, the output of which is supplied to transmitter 30, and thence to the receiver, either by wire line as a function of current intensity, or a modulation of carrier frequency oscillations, or as modulations of radio frequency oscillations transmitted through space. The synchronizing frequency or frequencies, derived from sources 23 and 24, are likewise transmitted to the receiver in a similar manner.

Referring now more particularly to Figure 2, I have shown the manner of arranging the screen within an envelope E, which is transparent to the light to be utilized, and the relative position of lens L in opaque screen S, and the object X at O whose image is to be transmitted.

Referring now more particularly to Figure 4, I have shown an arrangement adapted to operate in response to received signals from a transmitter such as is shown in Figure 1, to reproduce the image of the object being scanned by such transmitter. In this arrangement, the receiving screen, consisting of spaced electrode systems $a$ and $b$, is substantially similar to that of Figure 1. Likewise, the commutator devices 2 and 13 are substantially similar. The only substantial difference between the receiving arrangement and the transmitting arrangement is that in the receiving arrangement the strength or luminous intensity of the discharge is controlled in accordance with the intensity of light desired at a particular point at a particular time. In the arrangement shown, the luminous intensity of the discharge is controlled by apparatus which, in turn, is controlled by the signals received from the transmitter. For example, the incoming signals from the transmitter are received in a suitable receiver 31, which may be arranged to function with the type of signals received, whether they be direct current impulses, modulated carrier waves, or radio signals. The receiver 31 may comprise a radio frequency amplifier, and, in case the signals appear as modulations in different channels or frequency bands, filtering systems may be provided for the separation of the various frequency bands. An additional amplifier system 32 may be provided and arranged to amplify the signals after detection and separation of the various channels. The oscillations corresponding to the controlling frequency of the commutator 13 of the transmitter are applied to the control electrodes of commutator 13 in the receiver, and similarly, the oscillations corresponding to the controlling frequency of commutator 2 of the transmitter, are applied to the driving motor of commutator 2 of the receiver. The current or voltage corresponding to the output of the photo electric cell 28 of the transmitter is applied by means of a suitable modulator 33 to control the amplitude of oscillations generated by a suitable oscillator 34, the modulated output of which is impressed in the discharge circuit as a controlling potential, as by means of grid 5. The discharge circuit is substantially similar to that of Figure 1, and may be tuned to the frequency of the alternating current component, by suitable tuning means such as coil 6. It follows from this that the strength of the discharge and the luminous intensity thereof is dependent upon the output of the oscillator 33 which, in turn, corresponds to the output of the photo electric cell 28 in the transmitter. As a result of the transmission of synchronizing currents derived from sources 23 and 24, and which control the operation of the commutators 13 and 2 at the transmitter and receiver, it will be understood that the electron beam in commutator 13 at the receiver moves in synchronism with the electron beam in commutator 13 at the transmitter, and similarly, the brush in commutator 2 at the receiver moves in synchronism with the brush in commutator 2 of the transmitter, thereby assuring that the discharge at the receiver corresponds in position at any instant with the discharge at the transmitter.

Referring now more particularly to Figure 3, I have shown the preferred form of selector 13. The cathode 14 may be any suitable electron emitting device, such for example as a filament of the oxide coated type, and closely adjacent the said filament is positioned the grid 5 when the same is used. The anode in the preferred form comprises the plate 16, but in this instance a circular aperture $17^a$ is provided through which the electrons may pass.

The control field in this instance is impressed upon the beam by control plates 18 and 19, operated as before, and a second set of control plates $18^a$ and $19^a$ is disposed at right angles to the plates 18 and 19, and operated 90° out of phase therewith. The plates $18^a$ and $19^a$ may be energized by a coil $21^a$, which is coupled to coil 22, as in the case of coil 21. Suitable means diagrammatically shown as resistance "R" is provided for causing a 90° phase displacement between the fields produced by the two control systems, such that the beam is caused to sweep over a circular path instead of a straight line. The targets $b_1, b_2, b_3 \ldots b_{100}$ are disposed in a circle in the path followed by the beam.

An advantage of this arrangement is that the beam sweeps at a constant speed around the targets, whereas if it played back and forth in a straight line, its speed at different points in its position would be widely different, and the electrodes would necessarily have to be spaced with varying distances between them in order to obtain uniformity of operation.

While I have shown in this figure the use of dephased electrostatic control fields for swinging the electron beam, it will be understood that electrostatic and electromagnetic fields may be utilized in different arrangements serving to produce the same result.

While I have shown and described certain preferred embodiments of my invention, it will be understood that modifications and changes may be made without departing from the spirit and scope of my invention, as will be understood by those skilled in the art.

I claim:—

1. In a scanning system for television and the like, the combination of a multiplicity of relatively stationary electrodes so arranged that an illuminating electrical discharge may be produced at any predetermined point within the area to be scanned, by energization of electrodes corresponding thereto, means for energizing said electrodes and means for controlling an electron stream to select the electrodes to be energized to produce said discharge at said predetermined point.

2. In a scanning system for television and the like, the combination of a multiplicity of relatively stationary electrodes so arranged that an illuminating electrical discharge may be produced at any predetermined point within the area to be scanned, by energization of electrodes corresponding thereto, means for energizing said electrodes and means comprising an electron discharge commutator for selecting the electrodes to be energized to produce said discharge at said predetermined point.

3. In a scanning system for television and the like, the combination of a multiplicity of relatively stationary electrodes so arranged that an illuminating electrical discharge may be produced at any predetermined point within the area to be scanned, by energization of electrodes corresponding thereto, means for energizing said electrodes and means for controlling an electron stream to cause selection of the electrodes to be energized to produce successive substantially instantaneous illumination of all points in said area in a predetermined pattern.

4. In a scanning system for television and the like, the combination of a multiplicity of relatively stationary electrodes so arranged that an illuminating electrical discharge may be produced at any predetermined point within the area to be scanned, by energization of electrodes corresponding thereto, means for energizing said electrodes, and means comprising an electron discharge commutator for selecting the electrodes to be energized to produce successive substantially instantaneous illumination of all points in said area in a predetermined pattern.

5. In a scanning system for television and the like, the combination of a pair of spaced electrode systems corresponding to the area to be scanned, one of said electrode systems comprising a set of spaced adjacent linear electrodes so arranged that an illuminating electrical discharge may be produced between any of said linear electrodes and the other electrode system by energization of said electrodes, means for energizing said electrodes, and means comprising an electron beam for selecting the linear electrode to be energized to produce such discharge at any predetermined point in the area to be scanned.

6. In a scanning system for television and the like, the combination of a pair of spaced electrode systems corresponding to the area to be scanned, each of said electrode systems comprising a set of spaced adjacent linear electrodes, and the electrodes of one system being disposed at an angle to those of the other system, whereby an illuminating electrical discharge may be produced at any predetermined point within the area to be scanned by the energization of one electrode only of each system, means for energizing said electrode, and means comprising an electron beam for selecting the electrode of each system to produce such discharge at any predetermined point.

7. In a scanning system for television and the like, the combination of a pair of spaced electrode systems corresponding to the area to be scanned, each of said electrode systems comprising a set of spaced adjacent linear electrodes, and the electrodes of one system being disposed at an angle to those of the other system, whereby an illuminating electrical discharge may be produced at any predetermined point within the area to be scanned by the energization of one electrode of each system, means for energizing said electrodes, and means comprising an electron beam for selecting the electrodes of each system to produce successive substantially instantaneous illumination of all points in said area in a predetermined sequence.

8. In a scanning system for television and the like, the combination of a pair of spaced electrode systems corresponding to the area to be scanned, each of said electrode systems comprising a set of spaced adjacent linear electrodes, and the electrodes of one system being disposed at an angle to those of the other system, whereby an illuminating electrical discharge may be produced at any predetermined point within the area to be scanned by the energization of one electrode of each system, means for energizing said electrodes, and means comprising an electron beam for selecting the electrode of each system to be energized to produce successive substantially instantaneous illumination of all points in said area in a predetermined sequence, said means being so arranged that all of the electrodes of one system are selected in predetermined sequence, while one electrode of the other system is selected, to cause the point of illumination to pass linearly across the area to be scanned.

9. In a scanning system for television and the like, the combination of a pair of spaced electrode systems corresponding to the area to be scanned, each of said electrode systems comprising a set of spaced adjacent linear electrodes, and the electrodes of one system being disposed at an angle to those of the other, whereby an illuminating electrical discharge may be produced at any predetermined point within the area to be scanned by the energization of one electrode of each system, means for energizing said electrodes, and means substantially devoid of inertia for selecting the electrodes of each system to be energized, said means comprising an electrical discharge commutator contained within an exhausted container, said commutator comprising a series of targets, one for each electrode of one system, connections between said targets and the corresponding electrodes, means for producing an electron discharge beam, and means for causing said beam to pass successively over said targets at predetermined speed.

10. In a scanning system for television and the like, the combination of a pair of spaced electrode systems corresponding to the area to be scanned, each of said electrode systems comprising a set of spaced adjacent linear electrodes, and the electrodes of one system being disposed at an angle to those of the other, whereby an illuminating electrical discharge may be produced at any predetermined point within the area to be scanned by the energization of one electrode of each system, means for energizing said electrodes, and means substantially devoid of inertia for selecting the electrodes of one system to be energized, said means comprising an electron discharge commutator contained within an exhausted container, said commutator comprising a series of targets, one for each electrode of one system, connections between said targets and the corresponding electrodes, means for producing an electron discharge beam, and means for causing said beam to pass successively over said targets at predetermined speed, a second commutator comprising a series of contacts one for each electrode of the other system, connections between said contacts and the corresponding electrodes, a relatively moving contactor, and means for causing said contactor to pass successively over said segments at predetermined speed, said last named commutator being so arranged that the beam in said first commutator passes over all of the targets in said commutators, while the contactor in the other of said commutators remains on one segment.

11. The method of scanning for television and the like, with a pair of spaced electrode systems, each comprising a set of spaced adjacent linear electrodes, the electrodes of one system being disposed at an angle to those of the other set, whereby an illuminating electrical discharge may be produced at any predetermined point within the area to be scanned, by the energization of one electrode of each system, said method comprising maintaining an energizing difference of potential between one of the electrodes of one system, and a plurality of electrodes in succession of the other system and selectively controlling the energization of the electrodes of said other system by causing an electron beam to swing over a plurality of targets.

12. The method of scanning for television and the like, with a pair of spaced electrode systems, each comprising a set of spaced adjacent linear electrodes, the electrodes of one system being disposed at an angle to those of the other set, whereby an illuminating electrical discharge may be produced at any predetermined point within the area to be scanned by the energization of one electrode of each system, said method comprising successively connecting one terminal of a source of potential to each of the electrodes of one system in predetermined sequence, at a relatively low rate of speed, and successively connecting through an electron beam the other terminal of said source to each of the electrodes of the other system in predetermined sequence, while the first mentioned terminal of said source is connected to each electrode of the first system.

13. The method of scanning for television and the like, with a pair of spaced electrode systems, capable of producing an illuminating electrical discharge at any predetermined point within the area to be scanned by the energization of one electrode of each system, said method comprising maintaining an energizing difference of potential between one of the electrodes of one system and a plurality of electrodes in succession of the other system while controlling an electron beam to select the electrodes of one of said systems to be energized.

14. A system for television and the like, comprising a pair of electrode systems arranged to produce illumination at any predetermined point within the area to be scanned, a source of potential for producing an electrical discharge between said electrode systems, and means comprising an electron discharge device for controlling the position of said discharge.

15. A system for television and the like, comprising a pair of electrode systems arranged to produce illumination at any predetermined point within the area to be scanned, a source of potential for producing an electrical discharge between said electrode systems, and means comprising an electron discharge device for controlling the position and timing of said discharge.

Signed at New York city, in the county of New York and State of New York, this 22d day of September, A. D. 1927.

ALEXANDER McLEAN NICOLSON.